Aug. 16, 1949.  L. M. TINT  2,478,953

ADJUSTABLE POWER COUPLING

Filed July 30, 1945

Inventor
Lester M. Tint

By Ralph L. Chappell
Attorney

Patented Aug. 16, 1949

2,478,953

UNITED STATES PATENT OFFICE 2,478,953

ADJUSTABLE POWER COUPLING

Lester M. Tint, Palo Alto, Calif.

Application July 30, 1945, Serial No. 607,898

1 Claim. (Cl. 64—12)

(Granted under the act of March 3, 1883, as
amended April 30, 1928; 370 O. G. 757)

The present invention relates to adjustable, flexible power couplings and to a type for use with experimental laboratory equipment. In experimental laboratory equipment for test purposes, various types of equipment for transmitting rotative power are used. The equipment may be provided with uniform or non-uniform shafts that are coupled together. The coupling may be subjected to poor alignment or it may require a rapid change from one unit to another.

It is an object of the present invention to provide means for accommodating different size shafts in testing equipment.

Another object of the present invention is the provision of means for compensating for poor alignment of shafts.

A still further object of the present invention is the provision of means for rapid change from one unit to another.

With these and other objects in view, the invention consists in the combination and arrangement of parts to be hereinafter described and claimed, reference being had to the accompanying drawings in which the numerals of reference designate similar parts in the several views, and wherein;

Figure 1:
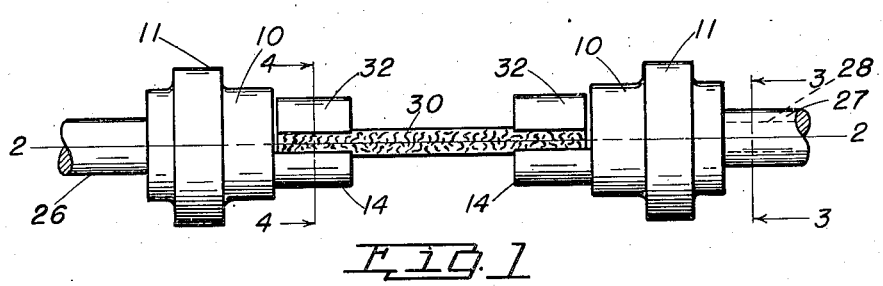
Fig. 1 is an elevational view illustrating my adjustable flexible coupling, the dotted line representing a shaft of smaller diameter.
Figure 2:
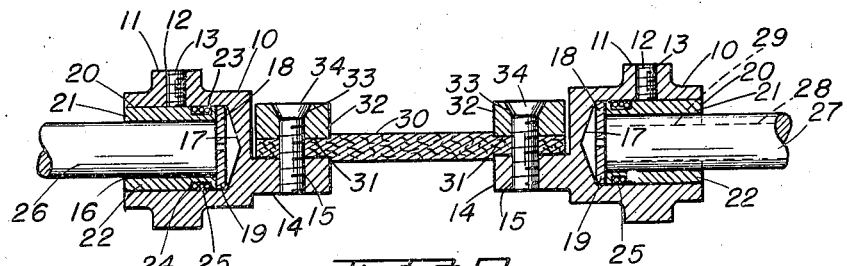
Fig. 2 is a longitudinal section taken on line 2—2 of Fig. 1, the dotted line representing a reduced shaft and a bushing.
Figure 3:
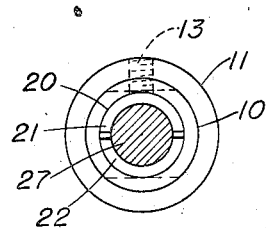
Fig. 3 is a sectional view taken on line 3—3 of Fig. 1 and looking in the direction of the arrows.
Figure 4:
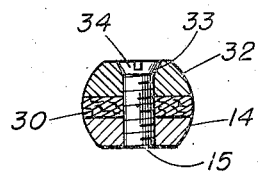
Fig. 4 is a sectional view taken on line 4—4 of Fig. 1.

Referring to the drawings, the numeral 10 represents a housing, and in the drawings a pair of housings are illustrated. The housing 10 is provided with a flange 11 having a threaded bore 12 that receives a set locking screw 13. One end of the housing has a reduced portion 14 that is provided with a threaded bore 15. Within the housing is a longitudinal bore 16, the end 17 of the bore being of conical configuration. In the bore 16 adjacent the conical end 17, there is provided semi-circular plates 18 and 19. The longitudinal bore receives a bushing 20 that comprises sections 21 and 22, section 21 having a circular groove 23 and section 22 a similar groove 24. The plates 18 and 19 are sweated or otherwise secured respectively, to the bushing sections 21 and 22 and serve to prevent the bushing from working out of the bore 16. The grooves 23 and 24 receive a split ring 25 that serves as a holding means for sections 21 and 22. As shown in Fig. 2 of the drawings, the split bushing in each housing engage portions of shafts 26 and 27, the ends of the shafts impinging one face of the end plates 18 and 19.

As shown in dotted lines in the right hand housing in Fig. 2, the shaft 28 may be of a reduced diameter to the shaft 26, and where such a condition is present, the walls of the split bushings 21 and 22, would of necessity, have to be thicker as represented by the numeral 29.

Interposed between the housing 10 is a leather connector engaging the portion 14 and being rigidly secured thereto by a clamping block 32 having a countersunk aperture 33 that receives a bolt 34, the threaded portion of which passes through the aperture 31 and engages the threaded aperture 15, thereby locking the leather connector to the element 14.

From the above description, it can be seen that the housing is so constructed that different size bushings may be used to accommodate the different size shafts, the outside diameter of the bushings being the same.

The leather connector provides a tough, pliable, resilient but strong coupling, one that requires no accurate alignment for satisfactory operation and one that is readily replaceable.

While the form of mechanism herein shown and described constitutes a preferred form of embodiment of the present invention, it is to be understood that other forms might be adopted, all coming within the scope of the claims which follow.

The invention described herein may be manufactured and used by or for the Government of the United States of America for governmental purposes without the payment of any royalties thereon or therefor.

What I claim is:

A flexible coupling for a pair of spaced shafts comprising a pair of housings each including at one end bore means for receiving the end of a shaft, a shaft-holding split-bushing for each housing composed of at least two half-cylindrical members having semi-circular end plates secured thereto, an annular channel in each of said split-bushing members, means in said channel adapted to hold said split-bushing members in cylindrical form on the end of the shaft, means including said split-bushing for locking a shaft in the bore means for each housing, a projection on the other end of each housing having a flat inner face eccentric to said bore means, a clamping block member having an opposed complementary face movably mounted with respect to each projection, and an elongated flexible member clamped at the ends between the complementary clamping faces of the housings to provide a flexible drive between the housings.

LESTER M. TINT.

REFERENCES CITED

The following references are of record in the file of this patent:

UNITED STATES PATENTS

| Number | Name | Date |
|---|---|---|
| 1,557,958 | Anderson | Oct. 20, 1925 |
| 1,712,219 | Knudsen | May 7, 1929 |
| 1,893,593 | Oeschsle | Jan. 10, 1933 |
| 2,295,316 | Yates | Sept. 8, 1942 |

FOREIGN PATENTS

| Number | Country | Date |
|---|---|---|
| 2,818 | Great Britain | 1912 |